United States Patent [19]
Raychaudhuri et al.

[11] Patent Number: 5,122,875
[45] Date of Patent: Jun. 16, 1992

[54] AN HDTV COMPRESSION SYSTEM

[75] Inventors: Dipankar Raychaudhuri, Princeton Junction; Joel W. Zdepski, Lebanon; Glenn A. Reitmeier, West Trenton; Charles M. Wine, Princeton, all of N.J.

[73] Assignee: General Electric Company, Princeton, N.J.

[21] Appl. No.: 661,993

[22] Filed: Feb. 27, 1991

[51] Int. Cl.$^5$ .................. H04N 7/12; H04N 7/00; H04N 7/04; H04N 5/2

[52] U.S. Cl. .................. 358/133; 358/141; 358/135; 375/25; 375/27; 370/110.1

[58] Field of Search ............ 358/133, 135, 136, 141, 358/142, 143, 144, 138, 12, 11; 375/122, 25, 27; 364/725; 371/2; 341/143; 370/118, 109, 110.1, 99

[56] References Cited

U.S. PATENT DOCUMENTS

| | | | |
|---|---|---|---|
| 4,394,774 | 7/1983 | Widergren et al. | 382/56 |
| 4,544,950 | 10/1985 | Tu | 358/141 |
| 4,594,708 | 6/1986 | Serve et al. | 370/99 |
| 4,745,474 | 5/1988 | Schiff | 358/136 |
| 4,785,349 | 11/1988 | Keith et al. | 358/136 |
| 4,809,067 | 2/1989 | Kikuchi et al. | 358/135 |
| 4,827,339 | 5/1989 | Wada et al. | 358/136 |
| 4,858,005 | 8/1989 | Lodge | 358/135 |
| 4,873,577 | 10/1989 | Chamzas | 358/133 |
| 4,903,125 | 2/1990 | Parker | 358/141 |
| 4,914,675 | 4/1990 | Fedele | 375/25 |
| 4,961,204 | 10/1990 | Tanaka et al. | 375/25 |
| 5,060,229 | 10/1991 | Tyrrell et al. | 370/110.1 |

OTHER PUBLICATIONS

M. Ghanbari, Two-Layer Coding Of Video Signals For VBR Networks, IEEE Journal on Selected Areas in Communications, Jun. 1989, vol. 7, No. 5, pp. 771-781.
J. Zdepski, K. Joseph, D. Raychaudhuri (David Sarnoff Research Center, Princeton, NJ) and D. G. Daut (Rutgers University, Piscataway, NJ) Prioritized Packet Transport Of VBR CCITT H.261 Format Compressed Video On A CSMA/DC LAN., Presented at Third International Workshop on Packet Video, Morristown, NJ, Mar. 22-23, 1990.
A. Artieri et al "A Chip Set Core For Image Compression", SGS-Thomson Microelectronics, Image Processing Unit, 17, avenue des Martyrs-B.P. 217, 38019 Grenoble Cedex, France.
International Organization For Standardization, ISO-IEC JTC1/SC2/WG11, "Coding Of Moving Pictures And Associated Audio", MPEG Video Committee Draft, MPEG 90/176 Rev. 2, Dec. 18, 1990.
Digicipher HDTV System, General Instrument Corporation, Videocipher Division, 6262 Lusk Blvd., San Diego, California, Jun. 8, 1990.

Primary Examiner—James J. Groody
Assistant Examiner—Michael L. Lee
Attorney, Agent, or Firm—Joseph S. Tripoli; Eric P. Herrmann; Ronald H. Kurdyla

[57] ABSTRACT

Apparatus for encoding/decoding a HDTV signal for e.g., terrestrial transmission includes a compression circuit responsive to high definition video source signals for providing ierarchically layered codewords CW representing compressed video data and associated codewords T, defining the types of data represented by the codewords CW. A priority selection circuit, responsive to the codewords CW and T, parses the codewords CW into high and low priority codeword sequences wherein the high and low priority codeword sequences correspond to compressed video data of relatively greater and lesser importance to image reproduction respectively. A transport processor, responsive to the high and low priority codeword sequences, forms high and low priority transport blocks of high and low priority codewords respectively. Each transport block includes a header, codewords CW and error detection check bits. The respective transport blocks are applied to an forward error check circuit for applying additional error check data. Thereafter the high and low priority data are applied to a modem wherein they quadrature amplitude modulate respective carriers for transmission.

18 Claims, 10 Drawing Sheets

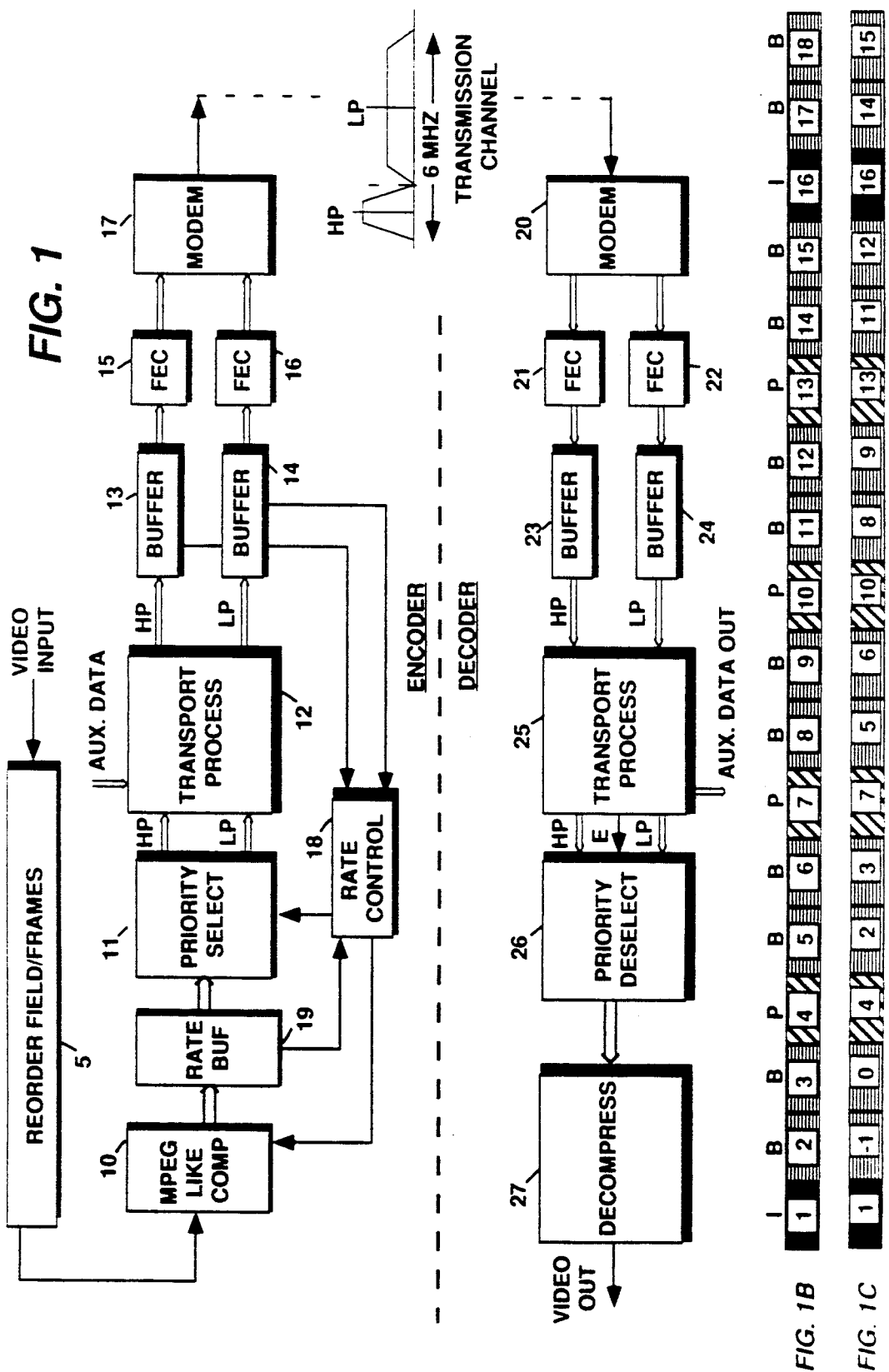

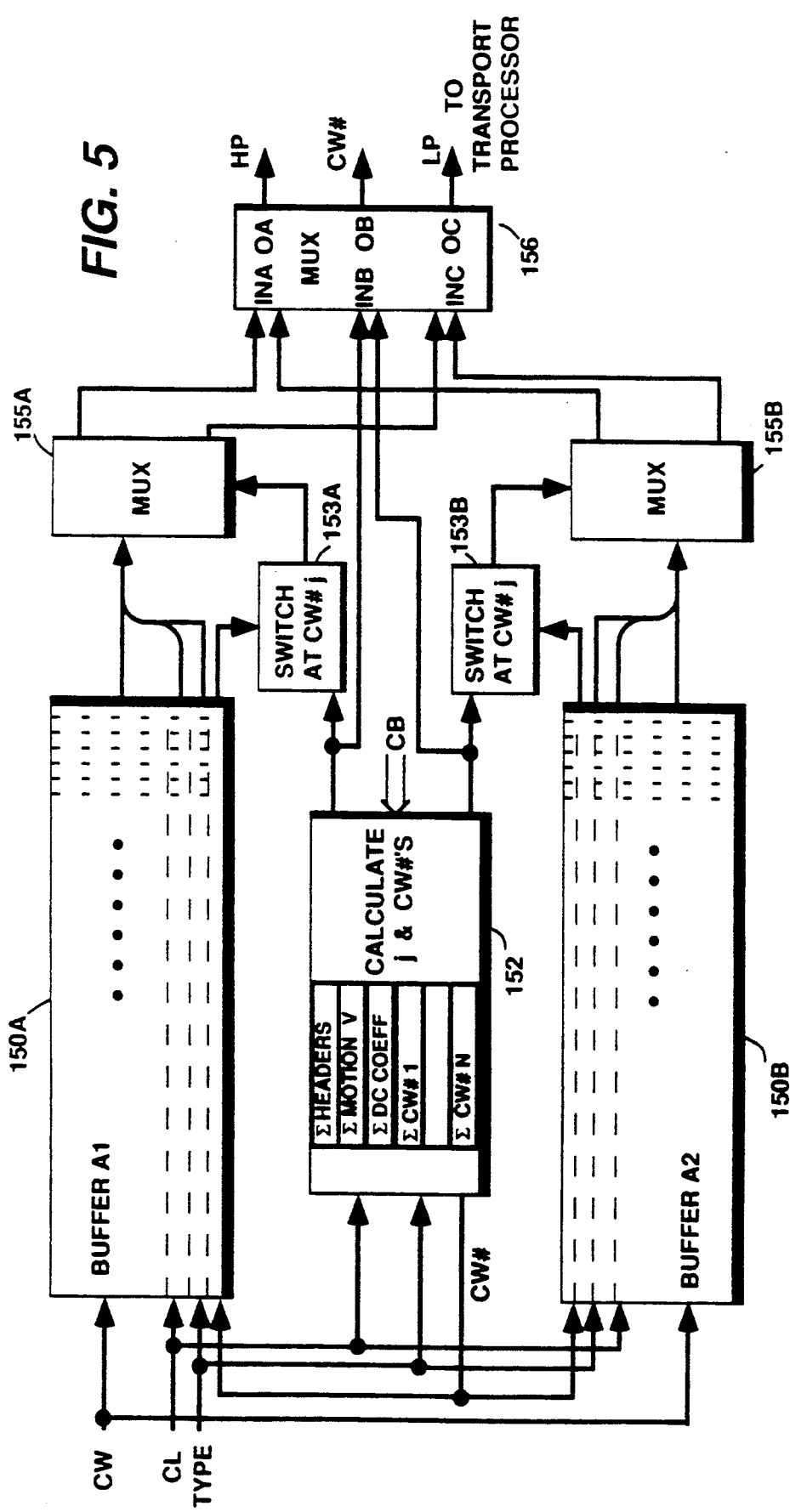

AN HDTV COMPRESSION SYSTEM

This invention relates to a system for providing and processing a high definition television (HDTV) signal.

BACKGROUND OF THE INVENTION

The International Organization for Standardization has been developing a standardized code for the representation of video signals for digital storage media. The standard is primarily intended for application to digital storage media supporting a continuous transfer rate up to about 1.5M bits/second, such as compact discs. It is intended for non-interlaced video formats having approximately 288 lines of 352 pixels and picture rates around 30 Hz. The standard is described in the document "International Organization for Standardization", ISO-IEC JT(1/SC2/WG1), Coding of Moving Pictures and Associated Audio, MPEG 90/176 Rev. 2, Dec. 18, 1990, which document is incorporated herein by reference for description of the general code format. The system according to this document will hereinafter be referred to an MPEG.

In the MPEG system, successive video frames are compressed according to one of three types of compression algorithms, intraframe coded (I), predicative coded (P), or bidirectional predictive coded (B). An example of which of successive frames are encoded by respective algorithms is illustrated in FIG. 1B. In FIG. 1B the numbered boxes correspond to respective successive frame intervals. The letters above each box correspond to the encoding type applied to the adjacent frame.

Intraframe coding encodes a frame using information from a single frame such that upon decoding the frame may be reconstructed entirely from one frame of I coded information. Intraframe encoding involves performing a discrete cosine transform (DCT) on the picture data and thereafter differentially encoding (DPCM) the DC coefficients generated and variable length coding (VLC) the differentially encoded DC coefficients and the AC coefficients.

Predictive coding involves generating a motion compensated prediction from an immediately preceding I or P frame, that is forward prediction. In this mode translation or motion vectors (MV) are generated which describe the displacement of image areas of the previous I or P frame to similar image areas of the current P frame. A predicted frame is generated using the motion vectors and the video information from the prior I or P frame. The predicted frame is then subtracted from the current frame and the differences (on a pixel basis), termed residues, are successively DCT and VLC encoded. The coded residues and the motion vector constitute the code data for the P frames.

The bidirectionally predictive coded frames occur between I and P or P and P or I and I frames and are encoded similarly to the P frames except that for each frame, motion vectors are generated relative to a successive I or P frame and a prior I or P frame. These motion vectors are analyzed for the best match and the predicted frame is generated from the vector indicated to more accurately predict an image area, or from a weighted average of predicted images using both the forward and backward vectors. Thereafter residues are generated, DCT transformed, and VLC coded. The coded residues and the motion vectors constitute the code data for the B frames.

Luminance, Y, and chrominance U and V, information are encoded separately, however the luminance motion vectors are used for developing both the luminance and chrominance B and P encoded frames. The motion vectors are transmitted only with the luminance information.

At the encoder and decoder ends of the system, the frames, B, that are to be bidirectionally encoded/decoded occur prior to successive P or I frames needed to perform the bidirectional encoding/decoding. Therefore, the sequence of naturally occurring frames are reordered to facilitate encoding/decoding. The reordering is illustrated in FIG. 1C and may be accomplished by simply writing the successively occurring frames to a buffer memory of appropriate capacity and reading the frames from the memory in the desired order. The encoded frames are transmitted in the reordered sequence obviating reordering at the decoder.

Apparatus for selectively performing the three types of compression is known, and described in, for example, the paper "A Chip Set Core for Image Compression" by Alain Artiere and Oswald Colavin, and available from SGS-Thomson Microelectronics, Image Processing Business Unit, 17, avenue des Martyrs-B. P. 217, Grenoble, France, which paper is incorporated herein by reference. This apparatus may be utilized to perform MPEG encoding by appropriate timing to select the compression type for respective frames and adding storage and multiplexing apparatus to add appropriate header information to the compressed data stream.

The MPEG standard transmits 240 lines (NTSC) per frame non-interlaced, which is typically accomplished by encoding only the odd or even fields of an interlaced source video signal, or by subsampling a non-interlaced source signal. In either event this format will not support reproduction of an HDTV image. In addition, since the MPEG standard is primarily directed to computer type display of video images and is expected to be communicated over dedicated transmission lines bit error generation is substantially non existent because the transmission channels are relatively noise free. Conversely, if an MPEG type encoded signal is to be employed for terrestrial HDTV transmission, significant data errors or signal corruption may be expected. As such special techniques are required to provide acceptable image reproduction.

SUMMARY OF THE INVENTION

The present invention includes apparatus for encoding/decoding a HDTV signal for, w.g., terrestrial transmission. A first embodiment corresponding to a HDTV signal encoder includes a compression circuit responsive to high definition video source signals for providing hierarchically layered codewords CW representing compressed video data and associated codewords T, defining the types of data represented by the codewords CW. A priority selection circuit, responsive to the codewords CW and T, parses the codewords CW into high and low priority codeword sequences wherein the high and low priority codeword sequences correspond to compressed video data of relatively greater and lesser importance to image reproduction respectively. A transport processor, responsive to the high and low priority codeword sequences, forms high and low priority transport blocks of high and low priority codewords respectively. Each transport block includes a header, codewords CW and error detection check bits. The respective transport blocks are applied to an forward error check circuit for applying additional error check data. Thereafter the high and and low priority data are applied to a modem wherein they quadrature amplitude modulate respective carriers for transmission.

A further embodiment, corresponding to a HDTV signal decoder, includes a modem responsive to transmitted signal for recovering the high and low priority signals from the transmitted signal. The high and low priority signals are coupled to an error correction circuit, which, responsive to said additional error check data performs, e.g., Reed-Solomon error correction on the received data. High and low priority data provided from the error correction circuit are applied to a transport processor. The transport processor excises transport block header information and error detection check bits from the data stream and provides respective sequences of high and low priority codewords, and transport header information. A priority deselect circuit, responsive to the sequences of high and low priority codewords and the transport header information combines the sequences of high and low priority codewords into a sequence of hierarchically layered codewords CW representing compressed video data. This sequence is coupled to a decompression circuit for generating a decompressed video signal representing HDTV images.

BRIEF DESCRIPTION OF THE DRAWINGS

FIG. 1 is a block diagrams of an HDTV encoding/decoding system embodying the invention.

FIGS. 1B-1C are pictorial representations of sequences of fields/frames of encoded video signal useful in describing the invention.

FIG. 5 is a block diagram of exemplary circuitry which may be implemented for the Priority Select circuitry of FIG. 1.

DETAILED DESCRIPTION

Figure 3A:
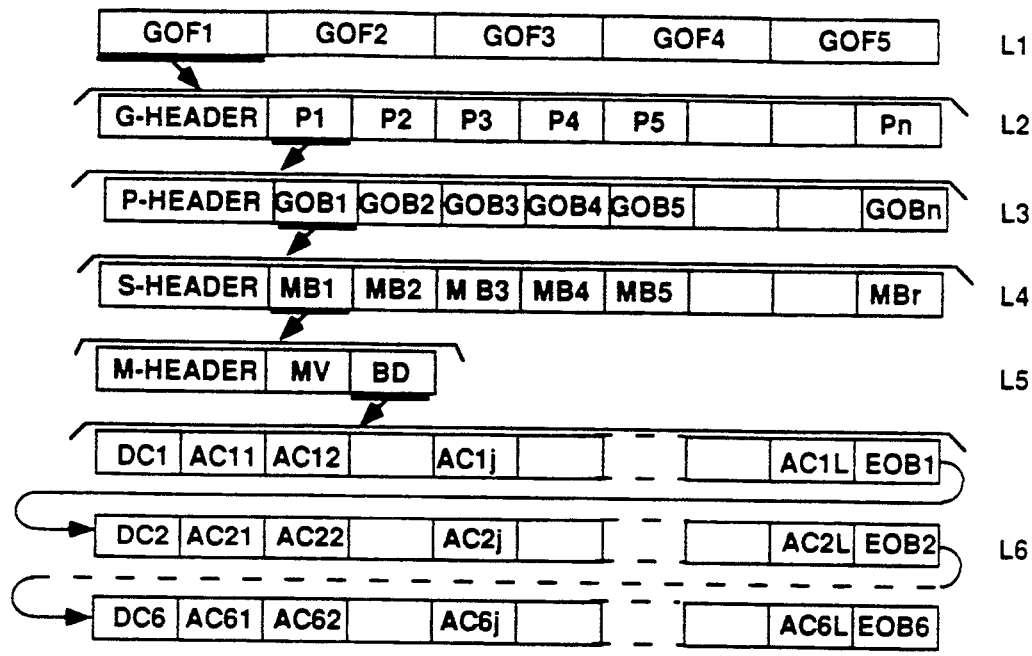
FIG. 3A is a generalized pictorial representation of the data format provided by the compression circuit of FIG. 3.

An exemplary HDTV system which may be supported by the present invention includes a two-to-one interlaced signal of 1050 lines at 59.94 frames per second. The nominal active picture has 960 lines of 1440 pixels each with an aspect ratio of 16×9. The signal is transmitted using two 64 quadrature amplitude modulated (64-QAM) carriers, frequency multiplexed in a 6 MHz transmission band. The nominal total bit rate, including video, audio and auxiliary data, is 26-29 Mbps.

The video signal is initially compressed in conformance with an MPEG-like format, albeit using both fields of each frame and with higher pixel density. Thereafter the MPEG-type signal codewords are parsed into two bit streams in accordance with the relative importance of the respective codeword types. The two bit streams are independently processed to apply error correction overhead bits, and then caused to QAM respective carriers. The modulated carriers are combined for transmission. The bit streams of relatively greater and lesser importance are designate high priority (HP) and low priority (LP) channels respectively. The high priority channel is transmitted with approximately twice the power as the lower priority channel. The high priority/low priority information ratio is approximately one-to-four. The approximate net data rates after forward error correction are 4.5 Mbps HP and 18 Mbps LP.

FIG. 1 illustrates an exemplary HDTV encoding/decoding system according to the invention. FIG. 1 shows the system processing a single video input signal, but it is to be understood that the luminance and chrominance components are compressed separately, and that the luminance motion vectors are utilized for generating compressed chrominance components. The compressed luminance and chrominance components are interleaved to form macroblocks before codeword priority parsing.

A sequence of image fields/frames as per FIG. 1B is applied to circuitry 5 which reorders the fields/frames according to FIG. 1C. The reordered sequence is applied to a compressor 10 which generates a compressed sequence of frames that are coded according to an MPEG-like format. This format is hierarchical and is illustrated in abbreviated form in FIG. 3A.

Figure 2:
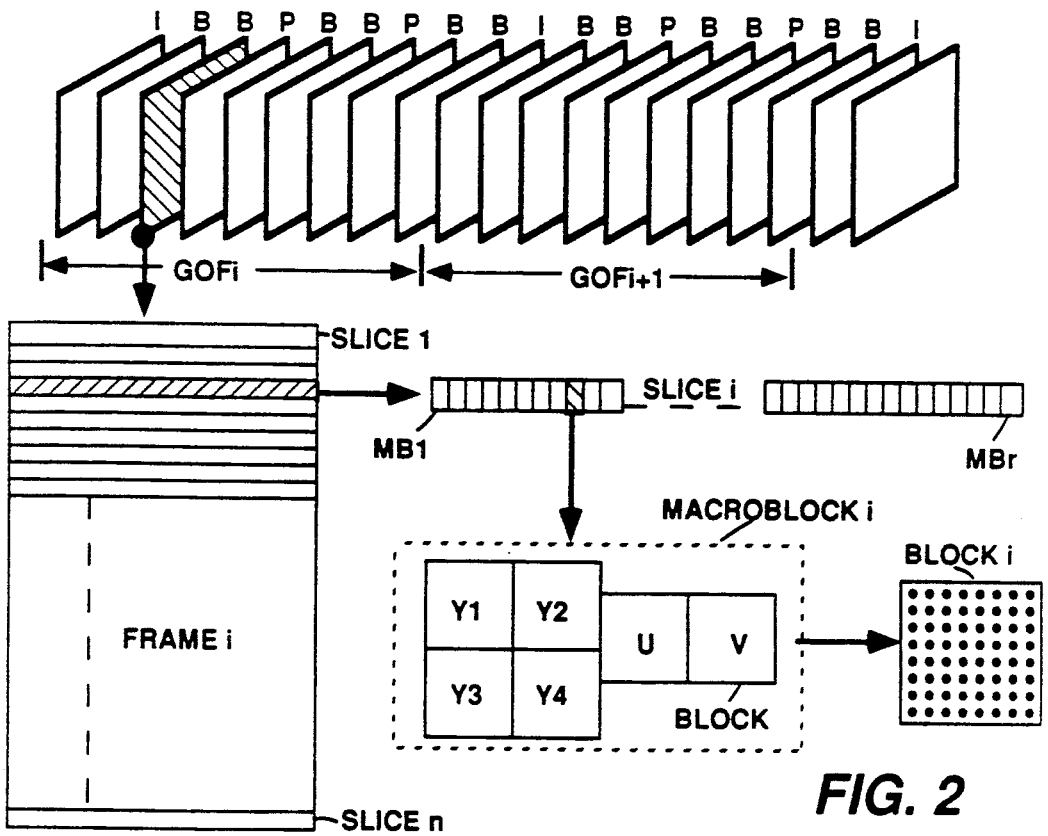
FIG. 2 is a pictorial representation of a macroblock of data provided by the compression circuit of FIG. 3.

The MPEG hierarchical format includes a plurality of layers each with respective header information. Nominally each header includes a start code, data related to the respective layer and provision for adding header extensions. Much of the header information (as indicated in the referenced MPEG document) is required for synchronization purposes in an MPEG systems environment. For purposes of providing a compressed video signal for a digital HDTV simulcast system, only descriptive header information is required, that is start codes and optional extensions may be excluded. The respective layers of the coded video signal are illustrated pictorially in FIG. 2.

When referring to the MPEG-like signal produced by the present system what is meant is that a) successive fields/frames of video signal are encoded according to an I, P, B coding sequence, and b) coded data at the picture level is encoded in MPEG-like slices or group of blocks albeit that the number of slices per field/frame may differ and the number of macro blocks per slice may differ.

The coded output signal of the present system is segmented in groups of fields/frames (GOF) illustrated by the row of boxes L2 (FIG. 3A). Each GOF (L2) includes a header followed by segments of picture data. The GOF header includes data related to the horizontal and vertical picture size, the aspect ratio, the field/frame rate, the bit rate, etc.

The picture data (L3) corresponding to respective fields/frames includes a header followed by slice data (L4). The picture header includes a field/frame number and a picture code type. Each slice (L4) includes a header followed by a plurality of blocks of data MBi. The slice header includes a group number and a quantization parameter.

Each block MBi (L5) represents a macroblock and includes a header followed by motion vectors and coded coefficients. The MBi headers include a macroblock address, a macroblock type and a quantization parameter. The coded coefficients are illustrated in layer L6. Note each macroblock is comprised of 6 blocks, including four luminance blocks, one U chrominance block and one V chrominance block. See FIG. 2. A block represents a matrix of pixels, e.g., $8 \times 8$ over which a discrete cosine transform (DCT) is performed. The four luminance blocks are a $2 \times 2$ matrix of contiguous luminance blocks representing, e.g., a $16 \times 16$ pixel matrix. The chrominance (U and V) blocks represent the same total area as the four luminance blocks. That is the chrominance signal is subsampled by a factor of two horizontally and vertically relative to luminance, before compression. A slice of data corresponds to data representing a rectangular portion of an image corresponding to an area represented by a contiguous group of macroblocks.

The block coefficients are provided one block at a time with the DCT, DC coefficient occurring first followed by respective DCT AC coefficients in the order of their relative importance. An end of block code EOB is appended at the end of each successively occurring block of data.

The amount of data provided by the compressor 10 is determined by the rate control element 18. As is well known compressed video data occurs at variable rates, and desirably, data is transmitted at a constant rate equivalent to the channel capacity, to realize efficient use of the channel. Rate buffers 13 and 14 perform the variable to constant data rate translation. It is also known to adjust the amount of data provided by the compressor in accordance with the level of occupancy of the buffers. Thus the buffers 13 and 14 include circuitry to indicate their respective level of occupancy. These indications are applied to the rate controller 18 to adjust the average data rate provided by the compressor 10. The adjustment is typcially accomplished by adjusting the quantization applied to the DCT coefficients. Quantization levels may be different for the different types of frame compression. Details of an exemplary method for determining quantization levels may be found in application Ser. No. 494,098, filed Mar. 15, 1990 and entitled "Digital Signal Coding With Quantization Level Computations," which application is included herein by reference.

Compressed video data hierachically formated as indicated in FIG. 3A is coupled to a priority select element 11, which parses the coded data between a high priority channel HP and a low priority channel LP. High priority information is that information, the loss or corruption of which, would create the greatest degradation in reproduced images. Stated conversely, it is the least data needed to create an image, albeit less than a perfect image. Low priority information is the remaining information. The high priority information includes substantially all of the header information included in the different hierarchical levels plus the DC coefficients of the respective blocks and a portion of the AC coefficients of the respective blocks (level 6, FIG. 3A).

The ratio of HP and LP data at the transmitter is approximately 1:4. At the transport processor auxiliary data is added to the signal to be transmitted. This auxiliary signal may include digital audio signal and, e.g., teletext data. In this example at least the digital audio will be included in the HP channel. The average amount of the auxiliary data included in the HP channel is calculated and compared to the expected statistical average of the compressed video information. From this the ratio of high and low priority compressed video information is calculated. The priority select element parses the data provided by the compressor 10 according to this ratio.

The HP and LP compressed video data are coupled to a transport processor 12 which a) segments the HP and LP data streams into transport blocks, b) performs a parity or cyclic redundancy check on each transport block and appends the appropriate parity check bits thereto, and c) multiplexes the auxiliary data with the HP or LP video data. The parity check bits are utilized by the receiver for isolating errors in conjunction with synchronizing header information and for providing error concealment in the event of uncorrectable bit errors in the received data. Each transport block includes a header including information indicative of the type of information included in the block, e.g., video audio and pointers to the starting points of contiguous like data.

The HP and LP data streams from the transport processor 12 are applied to the respective rate buffers 13 and 14, which convert the variable rate compressed video data from the processor 12 to data occurring at a substantially constant rate. The rate adjusted HP and LP data are coupled to forward error encoding elements 15 and 16 which a) perform REED SOLOMON forward error correction encoding independently to the respective data streams; b) interleave blocks of data to preclude large error bursts from corrupting a large contiguous area of a reproduced image; and c) appends, e.g., Barker codes to the data for synchronizing the data stream at the receiver. Thereafter the signals are coupled to a transmission modem wherein the HP channel data quadrature amplitude modulates a first carrier and the LP channel data quadrature amplitude modulates a second carrier displaced from the first carrier by approximately 2.88 MHz. The 6 dB bandwidth of the modulated first and second carriers are respectively about 0.96 MHz and 3.84 MHz. The modulated first carrier is transmitted with approximately 9 dB greater power than the modulated second carrier. Since the HP information is transmitted with greater power it is much less prone to corruption by the transmission channel. The HP carrier is located in the portion of the frequency spectrum of an, e.g., NTSC TV, transmission channel normally occupied by the vestigial sideband of a standard NTSC TV signal. This portion of the signal channel is normally significantly attenuated by the Nyquist filters of standard receivers and thus HDTV signals with this transmission format will not introduce cochannel interference.

At the receiver the transmitted signal is detected by the modem 20 which provides two signals corresponding to the HP and LP channels. These two signals are applied to respective REED SOLOMON error correcting decoders 21 and 22. The error corrected signals are coupled to rate buffers 23 and 24 which receive data at a variable rate commensurate with the requirements of the subsequent decompression circuitry. The variable rate HP and LP data is applied to a transport processor 25 which performs the inverse process of the processor 12. In addition it performs a degree of error detection responsive to the parity check bits included in the respective transport blocks. The transport processor 25 provides separated auxiliary data, HP data, LP data and an error signal E. The latter three signals are coupled to a priority deselect processor 26 which reformats the HP and LP data into an hierarchically layered signal which is applied to a decompressor 27. The decompressor 27 performs the inverse function of the compressor 27.

Figure 3:
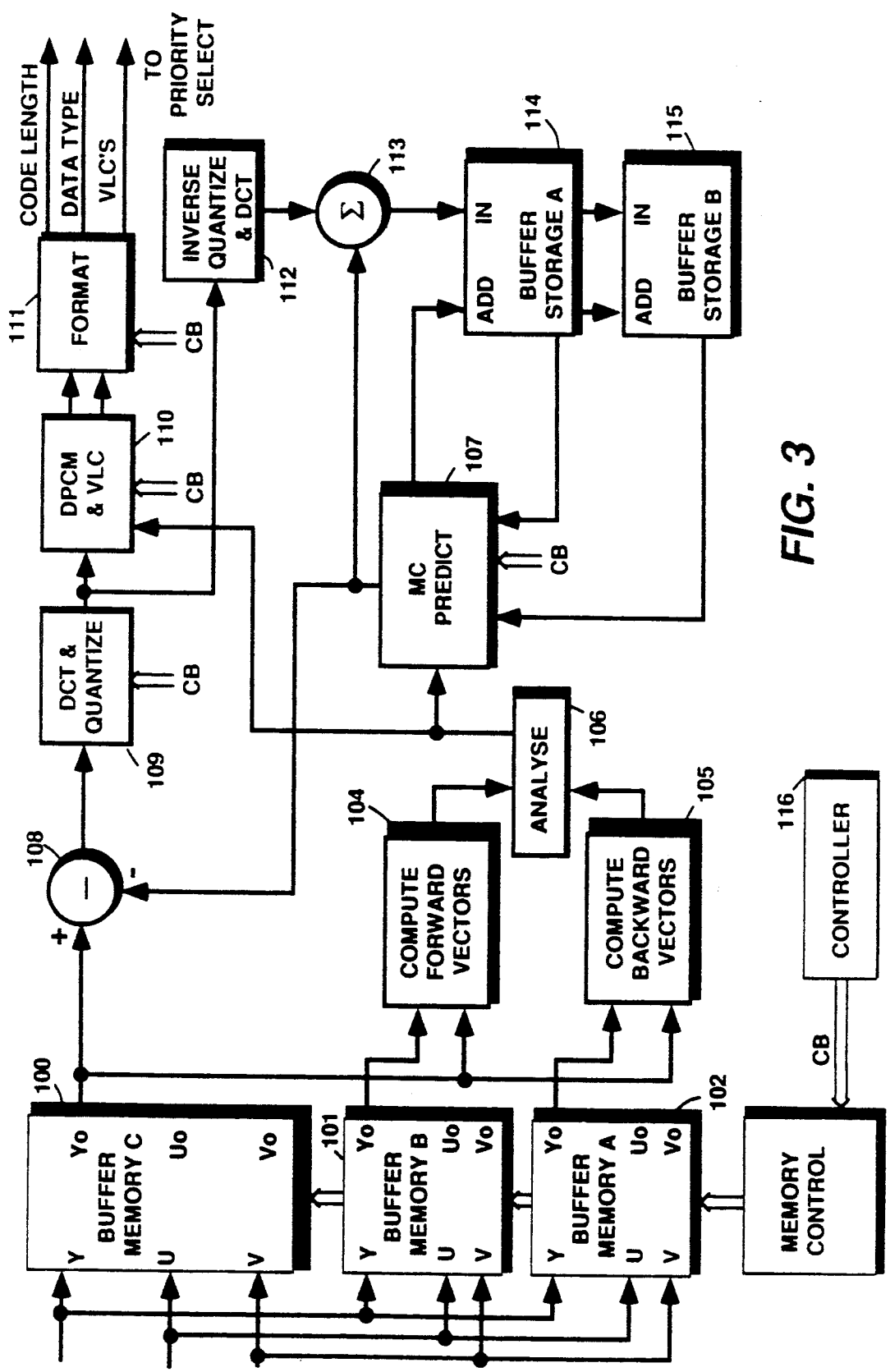
FIG. 3 is a block diagram of a video signal compression circuit.

FIG. 3 illustrates an exemplary compressor apparatus which may be utilized for element 10 of FIG. 1, for providing hierarchically layered compressed video data. The apparatus shown only includes the circuitry required to generate compressed luminance data. Similar apparatus is required to generate compressed chrominance U and V data. In FIG. 3 there are elements 104 and 105 designated as elements for computing forward and backward motion vectors respectively. Since whether a motion vector is forward or backward depends only upon whether the current field is analyzed with respect to a prior or succeeding field, both elements are realized with similar circuitry, and in fact both elements 104 and 105 alternate on a field/frame basis between generating forward and backward vectors. The elements 104 and 105 may be realized using integrated circuits of the type designated STI 3220 MOTION ESTIMATION PROCESSOR available from SGS-THOMSON MICROELECTRONICS. In order to achieve the necessary processing rates each of the elements 104 and 105 comprise a plurality of such integrated circuits operating simultaneously on different areas of respective images.

Element 109 designated DCT & Quantize performs the discrete cosine transform and quantization of transform coefficients and may be realized using integrated circuits of the type designated STV 3200 DISCRETE COSINE TRANSFORM available from SGS-THOMSON MICROELECTRONICS. Element 109 will also be realized with a plurality of such devices operated in parallel to concurrently process different areas of the image.

Refer to FIG. 1C and assume that frame 16 is currently available. Previously occurring P frame 13 has been snatched and stored in the buffer memory B 101. In addition a generated predicted frame 13 has been stored in one of the buffer storage elements 114 or 115. As frame 16 occurs it is stored in buffer memory A, 102. In addition frame 16 is applied to a working buffer memory 100. As frame 16 occurs, appropriate image blocks of data are coupled from the memory 100 to the minuend input of a subtracter 108. During I frame compression the subtrahend input of the subtracter 108 is held at a zero value so that data passes through the subtracter 108 unaltered. This data is applied to the DCT and quantizer element 109 which provides quantized transform coefficients to elements 110 and 112. Element 112 performs inverse quantization and inverse DCT transformation of the coefficients to generate a reconstructed image. The reconstructed image is applied via an adder 113 to, and stored in, one of the buffer storage elements 114 and 115 for use in compresssing subsequent B and P frames. During compression of I frames no information is added (by adder 113) to the reconstructed image data provided by element 112.

Element 110 performs two functions during I frame compression. First it performs differential (DPCM) coding of the DC coefficients generated by element 109. It then variable length encodes (VLC) the differentially coded DC coefficients and zero run and variable length encodes the AC coefficients generated by element 109. The VLC codewords are applied to a formatter 111 which segments the data and appends header information thereto in conformance with the layers illustrated in FIG. 3A. Coded data from element 111 is then passed to the priority select apparatus. Each of the elements 109, 110 and 111 are controlled by a system controller 116 to cyclically perform the appropriate operations at the appropriate times.

After frame 16 a "B" frame (14) occurs and is loaded into buffer memory 100. Data from frame 14 is coupled to both of elements 104 and 105. Element 104, responsive to frame 14 data from memory 100 and frame 13 data from memory 101, calculates forward motion vectors for respective blocks of 16×16 pixels of image data. It also provides a distortion signal which is indicative of the relative accuracy of the respective forward motion vectors. The forward motion vectors and the corresponding distortion signals are coupled to an analyzer 106.

Element 105, responsive to frame 14 data from memory 100 and I frame 16 data from memory 102, generates backward motion vectors and corresponding distortion signals which are also coupled to the analyzer 106. Analyzer 106 compares the distortion signals against a threshold, and if both exceed the threshold, provides both the forward and backward motion vectors as the motion vector, and also provides a corresponding signal related to the ratio of the distortion signals. Upon reconstruction predicted images are generated using both forward and backward vectors and corresponding frame data from which derived. An interpolated frame is generated from the forward and backward predicted frames in accordance with the ratio of distortion signals. If the distortion signals for both the forward and backward motion vectors are less than the threshold, the motion vector with the corresponding lesser valued distortion signal is selected as the block motion vector.

After the motion vector has been determined, it is applied to the motion compensated predictor 107 which accesses the appropriate data block defined by the vector from the previously regenerated frame 16 or frame 13 or both, stored in the storage elements 114 and 115. This data block is applied to the subtrahend input of the subtracter 108 wherein it is subtracted on a pixel by pixel basis from the corresponding block of pixel data from the current frame 14 provided by the buffer memory 100. The differences or residues are then encoded in element 109 and the coefficients applied to element 110. The corresponding block vector is also applied to element 110. For encoded B and P frames, the DC coefficients are not differentially encoded, but both the DC and AC coefficients are variable length encoded. The motion vectors are differentially encoded and then the differentially encoded vectors are variable length encoded. The coded vectors and coefficients are then transferred to the formatter 111. The encoded B frames are not inverse quantized and inverse transformed in element 112 since they are not used for subsequent encoding.

P frames are similarly encoded except that only forward motion vectors are generated. For example P frame 19 is encoded with motion vectors associating corresponding blocks of I frame 16 and P frame 19. During encoding of P frames, element 112 provides corresponding decoded residues and element 107 provides the corresponding predicted P frame. The predicted frame and the residues are added in adder 113 on a pixel-by-pixel basis to generate the reconstructed frame which is stored in the one of storage elements 114 and 116 not containing the frame information from which the predicted P frame is generated. The reconstructed and stored P frame is used for encoding subsequent B frames. For both P and B field/frames it should be noted that DCT's are performed on a block basis (e.g., a matrix of $8 \times 8$ pixels), but motion vectors are calculated for macroblocks (e.g., a $2 \times 2$ matrix of luminance of blocks or a $16 \times 16$ matrix of pixels).

Figure 4:
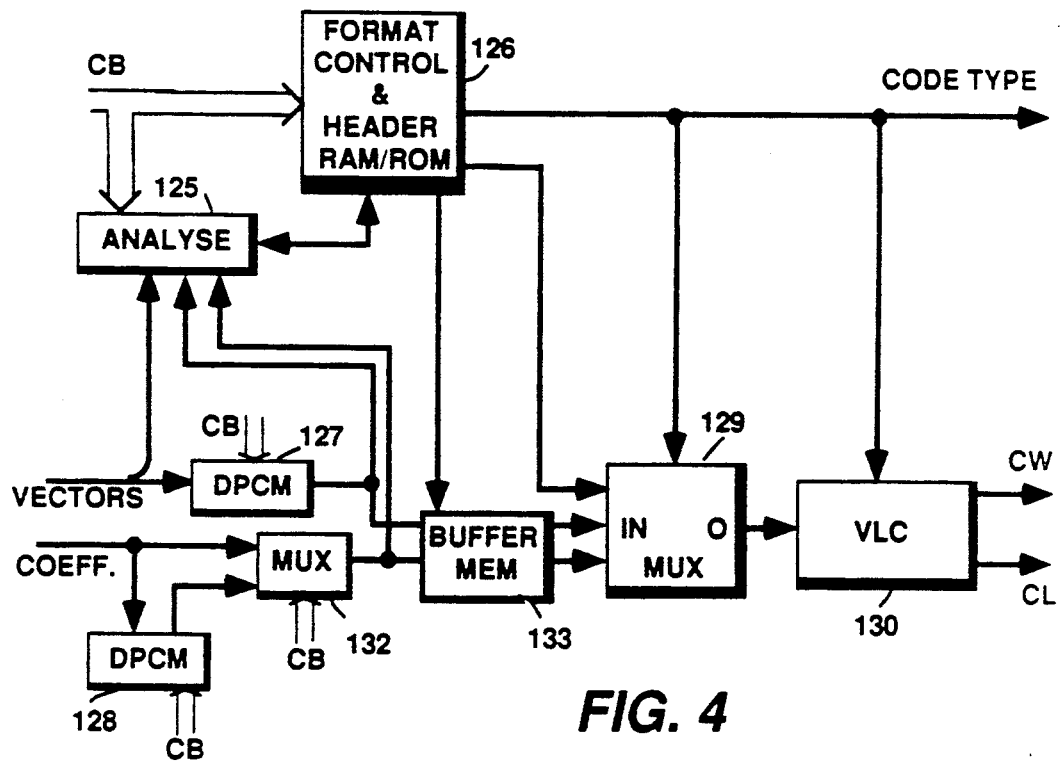
FIG. 4 is a block diagram of exemplary circuitry which may be utilized for the formatting circuit 111 of FIG. 3.

FIG. 4 shows exemplary circuitry in block form which may be used to implement the functions of elements 110 and 111 of FIG. 3. The output format of this circuitry diverges from that normally provided by an MPEG type encoder in that an MPEG output is a bit-serial data stream, but the data provided by the exemplary circuitry of FIG. 4 is in parallel-bit word format. This format is selected to facilitate the implementation of both the priority select processor and the transport processor. In addition two extra signals are provided which define the code type of each output codeword, CW, and the length, CL, of each codeword.

In FIG. 4 motion vectors from the analyzer 106 (FIG. 3) are differentially encoded in the DPCM element 127 on a slice basis and coupled to a multiplexer 129 via a buffer memory 133. Transform coefficients from the transform element 109 are coupled to a multiplexer 132 and a differential encoding element DPCM 128. Differentially encoded coefficients from the DPCM 128 are coupled to a second input of the multiplexer 132. During encoding of P or B frames all of the coefficients are passed directly through the multiplexer 132. During encoding of I frames, the DC coefficients are selectively differentially encoded by the DCPM 128. The differentially encoded DC coefficients and the non-differentially encoded AC coefficients are multiplexed by the multiplexer 132 and coupled to a second input of the multiplexer 129 via the buffer memory 133. Header information from a format control and header element 126 are coupled to a third input of the multiplexer 129. Element 126 includes stored information and control circuitry to a) provide the requisite header information for the different code layers (FIG. 3A) and to b) provide control signals to time division multiplex the header information, motion vectors and the transform coefficients via multiplexer 129. Element 126 is responsive to the system control circuitry via the control bus CB to provide the appropriate headers corresponding to picture size, rate, picture coding type quantizer parameters, etc. Certain of the header information is calculated by element 126 in conjunction with an analyzer 125. In the MPEG-type format much of the header information (e.g., level 5 of FIG. 3A) is variable such as the type of block encoding, the type of motion vectors, whether a block has zero valued motion vectors and or whether all coefficients in a block are zero values. The vector information and coefficient information is applied to the analyzer 125 to determine these types of header information. Whether a motion vector is a forward, backward and or zero valued is directly determinable by examination of the vectors. Whether all coefficients in a block are zero valued is determinable by simply accumulating the magnitudes of the vectors included in a block. Once the type of variable header data is determined, it is assigned a codeword and provided to the multiplexer 129 at the appropriate time. The element 126 also provides information relating to the codeword type currently being multiplexed, i.e., header information, motion vector information, DC coefficients, AC coefficients.

The time division multiplexed information is coupled to a variable length encoder 130 which is also controlled by element 126. In the figure the VLC control is shown provided by the codeword type signal. The different code types are variable length coded according to different VLC code tables and thus it is appropriate to utilize the code type signal for such control.

The VLC 130 may include a zero-run encoder for encoding zero runs of the AC coefficients and a plurality of Huffman code tables addressed by the respective codewords passed by the multiplexer 129 for variable length encoding the transform coefficients and the motion vectors. The particular table utilized is enabled by the code type signal. Each of the code tables may include corresponding tables programmed with the code lengths of the respective variable length codewords. The codewords CW and the code lengths CL are provided concurrently on separate busses in parallel-bit format. In general the header information is not variable length coded and is passed unaltered by the VLC 130. However, the VLC 130 includes code length tables responsive to the code type signal to provide the code lengths of the header codewords. Alternatively, a bit counter may be included in the VLC to count the number of bits of these data.

The element 126 also controls the writing and reading of data provided to and from the buffer memory 133.

FIG. 5 illustrates exemplary apparatus for performing the priority selection process. This apparatus may operate in several modes. For example, data may be prioritized on an equal basis for the different field/frame types, or on an unequal basis for the different field/frame types. In the latter instance assume that the HP channel passes 20 percent of the total data transmitted and that three percent of the HP channel is consumed by auxiliary data. If the video data is quantized for maximum transmission channel efficiency, 17.53% of the video data may be allocated to the HP channel. In the former instance, the high priority data for the I, P and B frames may be assigned in for example, the ratio of $\alpha{:}\beta 1$ respectively. The values $\alpha$ and $\beta$ may be user selectable and/or determined on a statistical basis from the amount of code data from prior encoded frames.

Figure 5A:
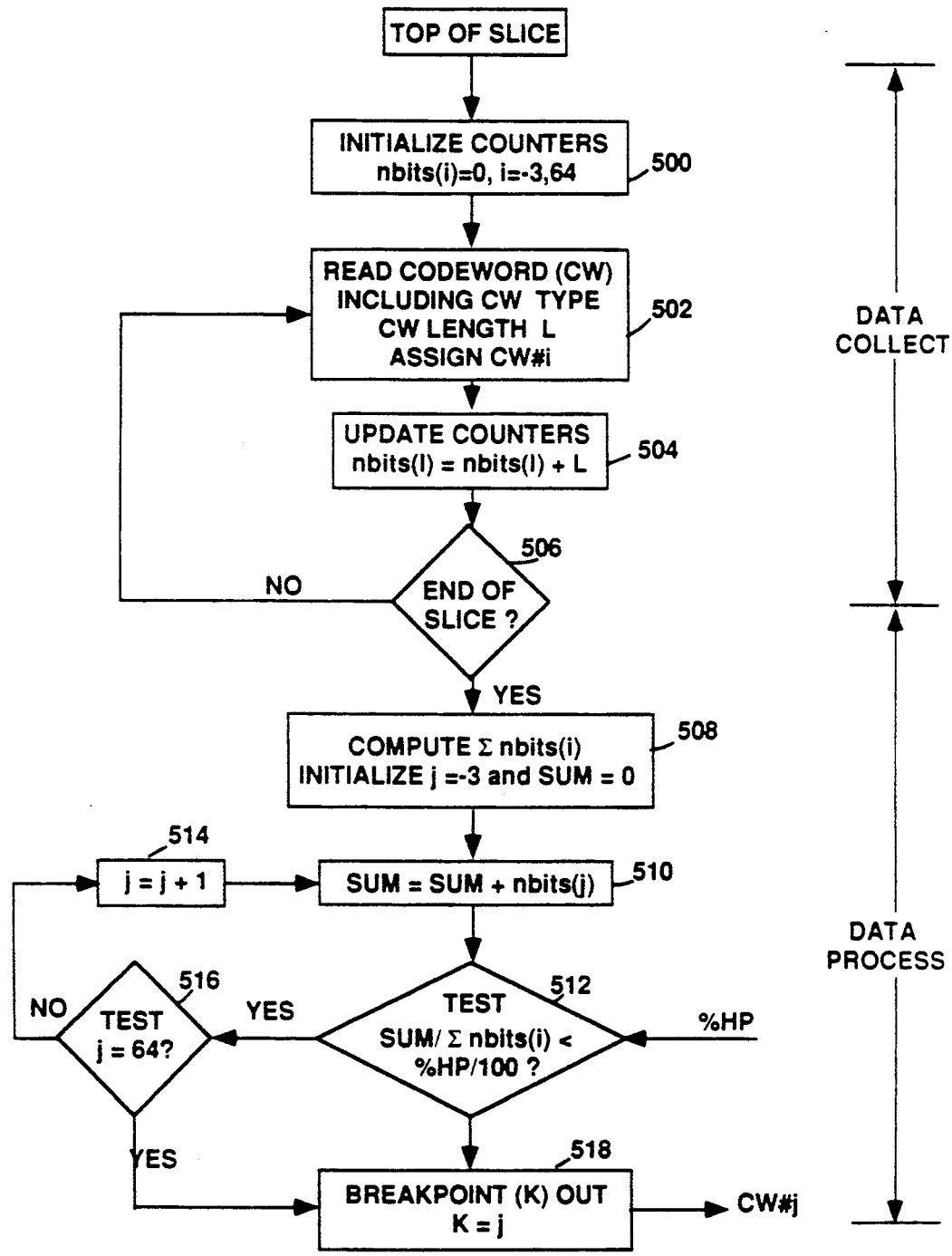
FIG. 5A is a flow diagram illustrating the operation of the FIG. 5 analyzer.

Refere to FIGS. 5 and 5A. In the following description, numbers in square brackets correspond to process blocks of FIG. 5A. Data from the variable length encoder 130 is coupled to respective input ports of two buffer memories 150A and 150B and to a data analyzer 152. The respective buffers include enough memory to store for example a slice of data. The buffers 150A and 150B are operated in "ping-pong" fashion to alternately write slices of data and read slices of data. Thus while buffer 150A writes data from, e.g., slice n, buffer 150B reads data from slice $n-1$.

As data is written to a particular buffer, the analyzer 152 generates a codeword number CW#i for each codeword and stores the CW#i in association with the corresponding codeword. The analyzer also calculates the point, or codeword, at which the data should be split between HP and LP channels. The calculation is determined for the amount of data stored in the buffer. There are four general types of data including Header Data, Motion Vectors, DC coefficients and AC coefficients. The DC and AC coefficients over a block occur in the order of DC coefficient first followed by codewords representing the AC coefficients in generally descending order of importance. The total number of bits are counted for all the codewords in the buffer. Then the codeword at which the sum of bits is just greater than the HP percentage is identified by a codeword number, CW#j. This number is applied to a switching element 153A (153B), and used to control the multiplexer 155A (155B). After the codeword number CW#j is identified, the codewords, codelength data, codeword type data and codeword numbers are read in parallel from the buffer 150A (150B). The codewords, codelengths and codetypes are applied to the input of a multiplexer 155A (155B), and the codeword numbers are applied to an input of the switching element 153A (153B). As the data is read from the buffer, the switching element 153A (153B) compares the codeword numbers to the calculated number CW#j. For all codeword numbers less than or equal to CW#j, the switching element provides a control signal which conditions the multiplexer 155A (155B) to pass the corresponding data to the HP channel via a further multiplexer 156. For codeword numbers greater than CW#j, the multiplexer 155A (155B) is conditioned to pass the corresponding data to the LP channel via multiplexer 156. The multiplexer 156 is conditioned to pass HP and LP data provided by the buffer 150A, (150B) which is currently being read.

The analyzer 152 is responsive to the codelength signals, and the code type signals. Responsive to the code type signals, the analyzer generates [502] codeword numbers for each occurring codeword. For example, each codeword representing header information is assigned the number (−2). Each codeword representing motion vectors and DC coefficients are assigned the numbers (−1) and (0) respectively. Successive AC codewords are assigned ascending integers i from 1 to n on a block-by-block basic.

The analyzer 152 also includes an accumulator which, responsive to the codelength and type signals, independently sums the number of bits of the codewords of each code type entered in the buffer 150A (150B). These sums are added [504] to provide the total number of codeword bits contained in the buffer. The total sum is multiplied by the decimal equivalent of the percent to be allotted to the HP channel to produce a check sum [512]. Thereafter the respective code type sums are sequentially added [508] in ascending order of codeword number CW#i to produce partial sums. Each partial sum is compared [512] with the check sum until the partial sum exceeds the check sum. The codeword number CW#j associated with the immediately previous partial sum is the last codeword within a block to be assigned to the HP channel [512-518]. All succeeding codewords, i.e., CW#j+1 to CW#n, for respective blocks are assigned to the LP channel.

Respective HP and LP data from the priority selector is arranged in transport blocks designed to enhance signal recovery and error concealment at the receiver.

Figure 6:
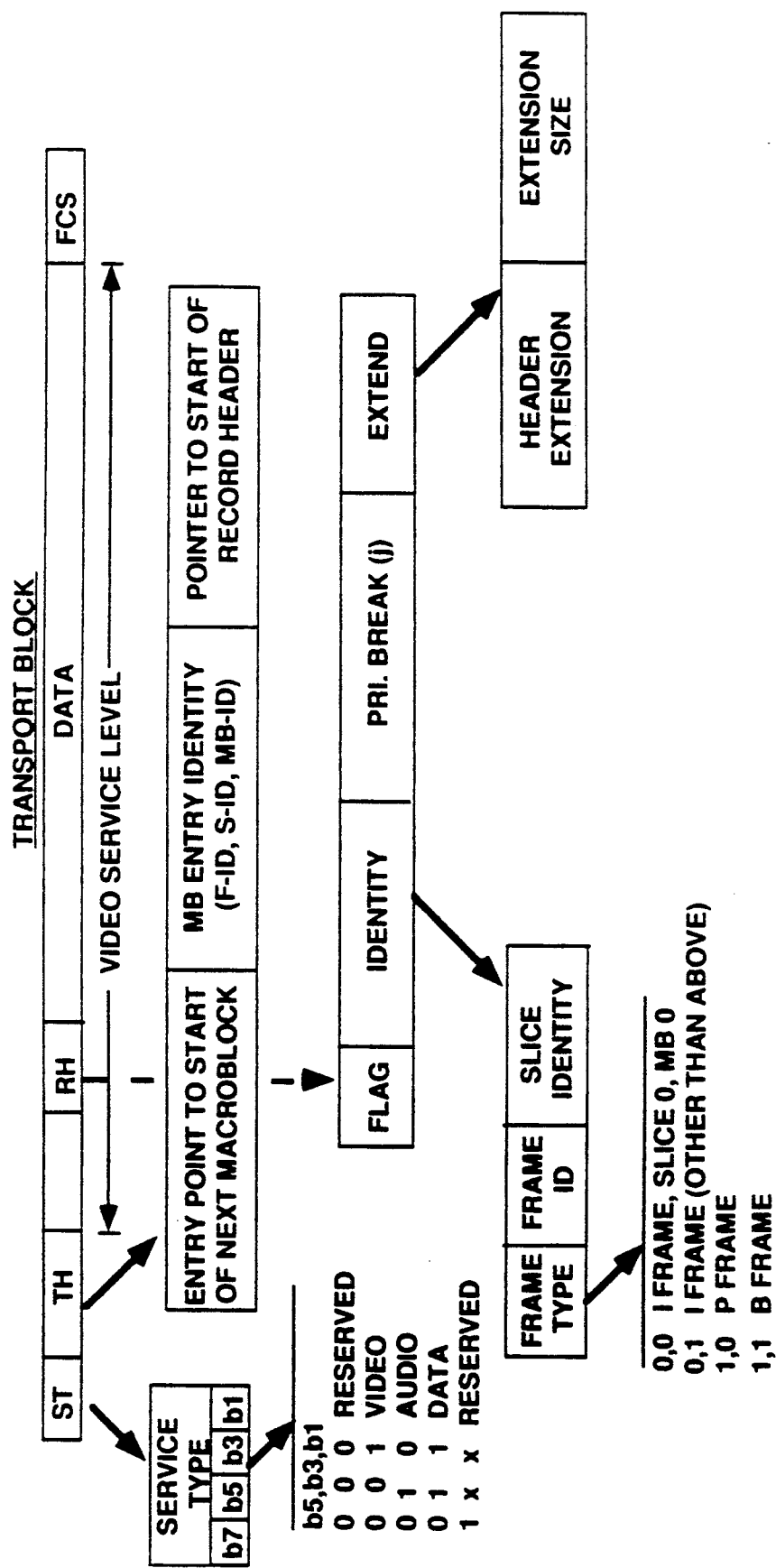
FIG. 6 is a diagram of the signal format provided by the transport processor 12 of FIG. 1.

The transport block format is illustrated in FIG. 6. An exemplary HP transport block includes 1728 bits and an LP transport block includes 864 bits. Respective transport blocks may include more or less than a slice of data. Thus a particular transport block may include data from the end of one slice and data from the beginning of the next subsequent slice. Transport blocks including video data may be interleaved with transport blocks containing other data, e.g., audio. Each transport block includes a service type header ST which indicates the type of information included in the respective transport block. In this example the ST header is an 8-bit word which indicates whether the data is HP or LP, and whether the information is audio, video or auxiliary data. Four bits of the 8-bit word are used to represent the ST information and four bits are used to provide Hamming parity protection of the ST information bits.

Each transport block includes a transport header TH immediately following the ST header. For the LP channel the transport header includes a 7-bit macroblock pointer, an 18-bit identifier and a 7-bit record header (RH) pointer. The transport header of the HP channel includes only an 8-bit record header (RH) pointer. The macroblock pointer is used for segmented macroblock or record header components, and points to the start of the next decodable component. For example, if the particular transport block includes macroblock data associated with the end of slice n and the beginning of slice n+1, the data from slice n is placed adjacent the transport header and the pointer indicates that the next decodable data is adjacent the transport header TH. Conversely, if a record header RH is adjacent the TH, the first pointer indicates the byte position following the record header RH. A zero valued macroblock pointer indicates that the transport block has no macroblock entry point.

The transport block may include none, one or more than one record header, and their positions are variable within the transport block. A record header occurs at the beginning of each slice of macroblock data in the HP and LP channel. No record headers are included in transport blocks that include only video data header information. The record header (RH) pointer points to the byte position containing the start of the first record header in the transport block. Note, the first record header in a transport block is placed at a byte boundary. That is, if a variable length code precedes the record header, the variable length code may be bit-stuffed to insure that the start of the record header occurs at a bit position which is an integral number of bytes from the beginning of the transport block. The record headers are placed at byte boundaries to enable the decoder to locate them since they are embedded in a stream of concatenated variable length codewords. A zero valued RH pointer indicates that there are no record headers in the transport block. If both the record header pointer and the macroblock pointer are zero valued, this state indicates that the transport block includes only video data header information.

The 18-bit identifier in the LP transport header identifies the current frame type, the frame number (modulo 32), the current slice number, and the first macroblock contained in the transport block.

Following the transport header is either a record header, RH, or data. As indicated in FIG. 6 the record header for the video data in the HP channel includes the following information: A 1-bit FLAG which indicates if a header extension, EXTEND, is present. Following the FLAG is an identifier IDENTITY, which indicates a) the field/frame type I, B or P; b) a field/frame number (modulo 32) FRAME ID; and c) a slice number (modulo 64) SLICE IDENTITY. Following the identifier the record header includes a macroblock priority break point indicator, PRI BREAK (j). The PRI BREAK(j) indicates the codeword number CW#j, developed by the analyzer 152 of the priority selector, for dividing the codewords between the HP and LP channels. Lastly, an optional header extension may be included in the HP record header.

The record header incorporated in the LP channel includes only an identifier, IDENTITY, similar to the identifier implemented in the HP channel.

Each transport block is terminated with a 16-bit frame check sequence, FCS, which is calculated over all bits in the transport block. The FCS may be generated using a cyclic redundancy code.

Figure 7:
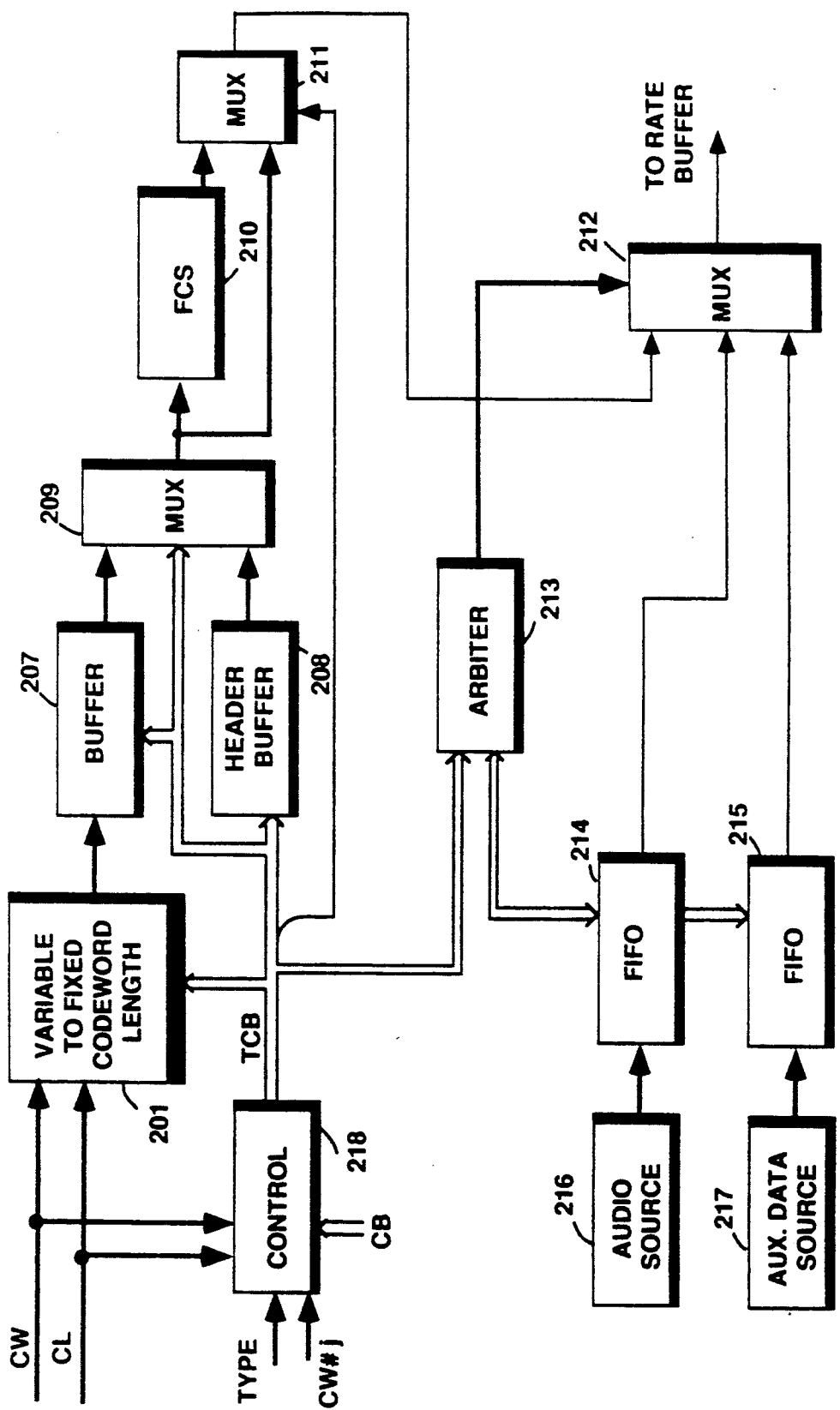
FIG. 7 is a block diagram of exemplary circuitry which may be implemented for the Transport Process circuit of FIG. 1.

FIG. 7 illustrates exemplary apparatus of the transport processor. In the figure an arbiter 213 interleaves, via a multiplexor 212, transport blocks of video data from a multiplexer 211, audio data from a memory 214 and auxiliary data from a memory 215. The audio data is provided in transport block form by the source 216 and applied to a first-in first-out memory 214. The auxiliary data is provided in transport block form by the source 217 to a first-in first-out memory 215. The formats of the audio and auxiliary data transport blocks may differ from the format of the video transport blocks, however all transport blocks will include a leading service type header, and preferably will be of equal length. The arbiter 213 responds to the level of occupancy of buffers 214, 215 and 207 in such fashion to insure that none of these buffers overflow.

The apparatus of FIG. 7 operates on one of the HP or LP signals and similar apparatus is required for the alternate signal. However, if all of the audio and auxiliary signal is HP data an arbiter for interleaving transport blocks will not be included in the LP transport block processor and vice versa.

In FIG. 7, codeword, CW, codelength, CL, and code type, TYPE, data from the priority selector are coupled to a transport controller 218, and the codewords and code type signal are coupled to a variable word length to fixed word length convertor 201. The convertor 201 packetizes the variable length codewords into, for example, 8-bit bytes in order to reduce the amount of storage space required of the rate buffers 13 and 14. The convertor 201 may be of the type described in U.S. Pat. No. 4,914,675. The fixed length words provided by the convertor 201 are temporarily stored in the buffer 207.

The transport controller 218 responds to the CW, CL, TYPE and CW#j data to construct the transport block headers (ST, TH, RH) and applies these headers to a header buffer 208, which may be internal to the controller 218. Responsive to the code lengths, code types and codewords, the controller 218 generates the requisite timing signals for interleaving (via the multiplexer 209) the fixed length video data words and transport block header information into transport blocks of predetermined numbers of bits.

The transport blocks provided by the multiplexer 209 are coupled to one input of the multiplexor 211 and to the input terminal of a frame check sequence coder FCS 210, the output of which is coupled to a second input of the multiplexer 211. The FCS 210, responsive to transport block data forms two-byte error check codes for respective transport blocks. The multiplexer 211 is conditioned to pass respective transport blocks provided by the multiplexer 209, and then to append the 16-bit or two-byte FSC code from element 210 to the end of the transport block.

In the foregoing description of the transport processor it is assumed that all of the header information provided by the compressor 10 is included in the video data stream provided by the transport processor. It should be recognized that much of the video data header information is also included in the transport headers and as such provides redundant information. In an alternative arrangement, the controller 218 may preclude the converter 201 from accepting video header data which would be redundantly included in the transport block headers, thus enhancing the overall coding efficiency. At the receiver the excised video header data may be reconstructed from the transport block header information and reinserted in the video data stream.

At the receiver, detected signal is applied to forward error correction circuits 21 and 22 to perform error correction on the respective HP and LP signals. Error corrected data is then applied to the transport processor 25 via rate buffers 23 and 24. Even though the detected data has undergone error correction in the FEC circuits 21 and 22, certain errors occurring during signal transmission may not be correctable by the FEC circuits. If these errors are allowed to pass to the decompression circuitry, very objectionable corruption may occur in the reproduced image. To preclude such happenstance each transport block includes independent error detection codes to identify the occurrence of errors which pass through the FEC circuits, and responsive to such error indications the system may provide appropriate error concealment.

Figure 8:
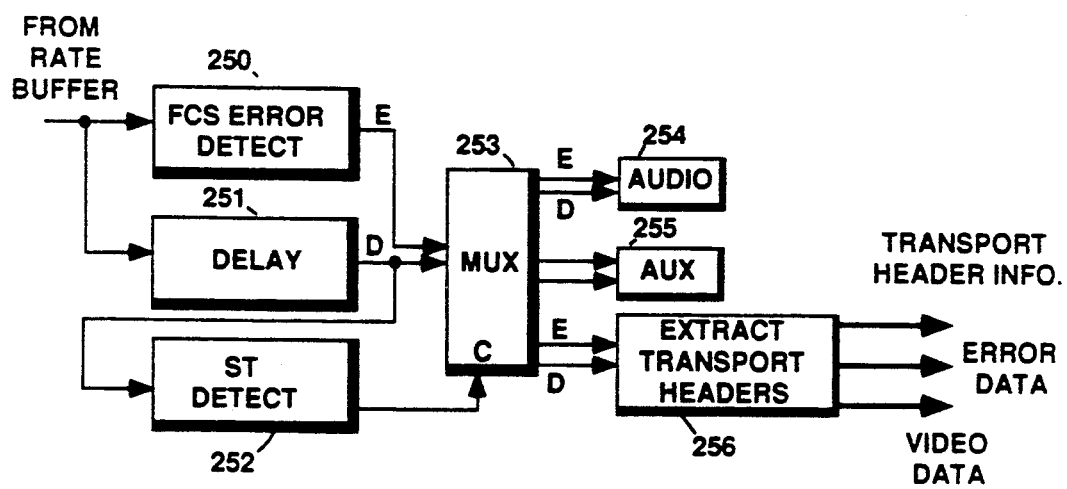
FIG. 8 is a block diagram of exemplary circuitry which may be implemented for the transport processor 25 of FIG. 1.

FIG. 8 illustrates the transport processor 25 included in the receiver portion of the system. Two such processors are required, one for the HP channel and one for the LP channel. If it is known a priori that audio or auxiliary data will always be excluded from a particular channel, the corresponding elements may be eliminated from such channel transport processor.

In FIG. 8 data from the rate buffer 23 or 24 is applied to an FCS ERROR detector 250 and a delay element 251. Delay element 251 provides a delay of one transport block interval to allow the detector 250 to determine if any errors are present in the corresponding transport block. The detector 250 provides an error signal E indicating the presence or absence of errors in the transport block. The error signal is applied to the input port of a one-to-three demultiplexer 253. The delayed transport block data is also applied to the input port of the multiplexer 253. Delayed transport block data is also coupled to a service type detector (ST DETECT) 252, which examines the ST header and responsive thereto conditions the multiplexer 253 to pass the transport block data and corresponding error signal to the appropriate one of the audio, auxiliary or video signal processing paths. Even though an error may be detected in a transport block, the ST code may still be relied upon because it has been independently Hamming code protected.

In the respective audio, auxiliary and video signal processing paths the error signal may be utilized in different ways to effect error concealment. In the video signal processing path the error signal may be utilized in alternative ways depending upon the error concealment circuitry included in the decompressor 27. In the simplest case assume that the decompressor 27 includes a display memory in which information is updated as information is decoded. If no information is received for a particular portion of an image, the corresponding portion of the display memory is not updated. Those image portions that are not updated are simply repeated in successive frames until new data is received. If it is assumed that error concealment by repeating information from frame-to-frame is acceptable, in the video signal processing path the error signal may be utilized to simply excise transport blocks with detected errors from the video data stream. Alternatively, for more sophisticated error concealment the transport block data may be retained but tagged with the error indication to alert the decompressor to perform alternative error concealment functions.

In the video signal processing path, the transport block data and error signal are coupled to a processing element 256 which excises the FSC code and the transport block headers ST, TH and RH from the data stream. It may also be arranged to delete entire transport blocks in which errors have been detected. Element 256 provides the video data with transport block headers excised, the error data and the transport headers to the priority deselect processor 26 on separate busses.

The FEC circuits 21 and 22 provide the received data in fixed length words corresponding to the fixed length words provided to the FEC circuits 15 and 16 of the encoder. As such the transport block header data occurs on byte boundaries which are either predetermined (ST, TH and FCS) or are identified (RH) by the transport header. Thus it is a relatively simple matter to identify and extract the requisite transport block headers from respective transport blocks.

Figure 9:
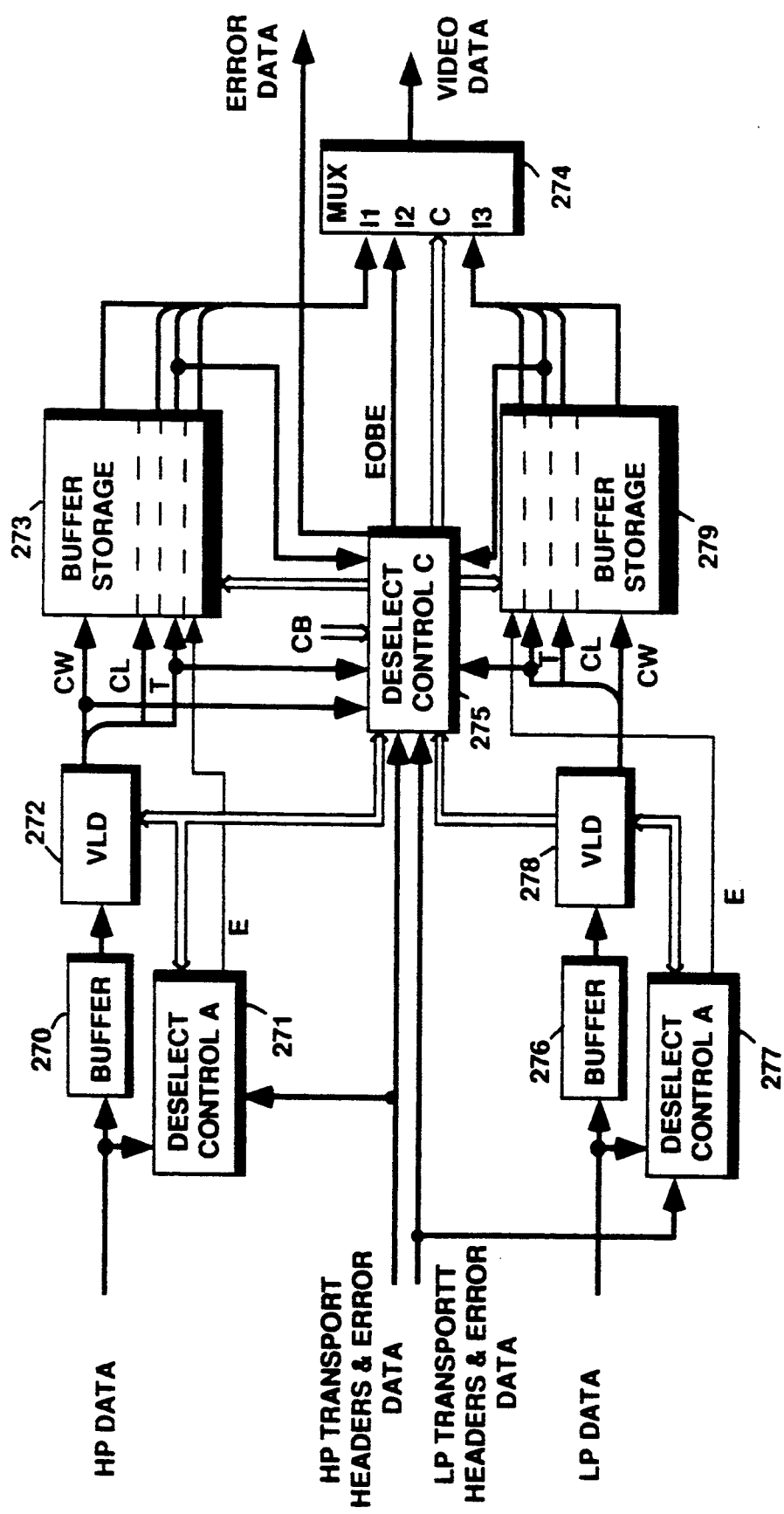
FIG. 9 is a block diagram of exemplary circuitry which may be implemented for the priority deselect circuit 26 of FIG. 1.

FIG. 9 illustrates an exemplary priority deselect processor. The priority deselect processor accepts data from the receiver transport processor and reconfigures it to the form applied to the encoding priority select processor 11. In order to do so respective codewords of the data stream have to be identified, that is the codeword CW#j in each block must be detectable. Since the data is in the form of concatenated variable length codes, it must be at least partially VLC decoded to define the codeword boundaries. Once the codeword boundaries are determined, the codewords may be counted to find CW#j (in the HP channel). After the codeword boundaries are identified the codewords may easily be parsed into respective parallel-bit VLC code form.

In FIG. 9 similar circuits (270, 271, 272, 273) and (276, 277, 278, 279) responsive to HP and LP data respectively, parse the incoming data into parallel-bit VLC codewords. The HP and LP codewords are respectively coupled to a multiplexer 274 which, responsive to a deselect controller 275 recombines the data into a data sequence similar to that provided by the compressor 10.

Consider the HP channel circuitry 270-273. Video data from the element 256 (FIG. 8) is applied to a buffer memory 270 and a deselect controller 271. In addition the HP transport block headers are applied to the controller 271. The video data, absent errors, will occur in predetermined cyclical sequences. Particular points in a sequence are identifiable from the transport block header information. Once a start point is identified, decoding proceeds in the predetermined sequence. The deselect controller 271 is programmed to condition the variable length decoder VLD for operation according to this sequence. For example, assume that the transport header indicates that current data is from an I field and that a record header occurred at byte z. The record header was placed at the beginning of a slice, thus the entry point of a slice can be identified relative to byte z. At this point the slice header of known bit/byte coding format is known, which header is followed by a macroblock header of known bit/byte coding format, followed by block data in known coding format, and so on. Thus, responsive to the transport header information the controller 271 establishes the decoding sequence of the VLD 272, i.e., which VLD decoding tables to use for which grouping of VLC codewords. Note that since, e.g., the slice header in the data stream is not variable length encoded, the controller may be arranged to compare common slice header information with transport header information for entry point confirmation.

The video data from the buffer 270 is coupled to the VLD 272 which concatenates a number of the fixed length codewords, and examines the leading bits of the concatenated codewords for a recognizable codeword according to the type of coding expected vis-a-vis the normal cyclical sequence. Once a particular number of leading bits is recognized as a valid codeword, these bits are output as a parallel-bit codeword CW to a buffer store 273. In addition the expected codeword type, T, and codeword length CL are produced and applied to the buffer store 273. As the codewords are loaded into the buffer store 273 they are indexed by the deselect controller 275.

DC and AC coefficient codewords are encoded according to different statistics, and the coefficients of respective blocks within a macroblock are concatenated without including end of block identifiers. In general however the DC coefficient of the first block in a macroblock is identifiable by its position within the bit stream. The VLD cannot discern between the last AC coefficient of one block and the DC coefficient of the next block. Identification is provided by the CW#j included in the transport block header information. The CW#j identifies the last AC coefficient codeword in each block in a slice. To find the codeword numbered (j) the deselect controller 275 monitors the code types T provided by the VLD. The controller 275 counts the AC type codes T, and when j have occurred the controller 275 communicates with the VLD 272 to reset the cycle to a DC coefficient decoding event.

Elements 276-279 in the LP channel operate in a similar manner. The LP data however is expected to include only AC coefficient codewords. The AC codewords for respective blocks within a macroblock are separated by end of block (EOB) codes, hence there is no need to count codewords. The operation of VLD 278 may simply be to decode words which are all coded according to one coding table. The position of the first macroblock in transport block is identified by the respective transport header, and each successive macroblock is identified by record headers. This information is evaluated by the deselect controller 277 for controlling the VLD 278 for indexing the codewords in the storage buffer 279.

Responsive to the indexed information and the type T codewords stored in the storage buffers 273 and 279, the deselect controller 275 concatenates the HP and LP codewords stored in the storage buffers 273 and 274 via a multiplexer 274. The controller identifies a macroblock, conditions the multiplexer 274 to pass data from the HP channel and reads the respective HP data from storage buffer 273 up to codeword CW#j of block one of the macroblock. It then conditions the multiplexer to pass data from the LP channel and reads the AC coefficient codewords corresponding to the same block one, until an EOB type code occurs. Thereafter controller 275 conditions the multiplexer 274 to pass data from the HP channel and commences reading HP data corresponding to block two of the macroblock. After the codeword corresponding to CW#j is read, the controller again switches to read LP data for block two from the LP channel, etc.

If while reading data from the high priority channel an EOB code occurs before the codeword corresponding to CW#j occurs, the controller 275 is reset to read the next block of data from the high priority channel.

The cyclic nature of occurring codewords may be variable. For example some macroblocks within a slice may not be coded and/or some blocks within a macroblock may not be coded. This information is included in the respective slice and macroblock headers. In order to establish and maintain the appropriate decoding cycles, the controller 275, responsive to the codeword types examines the slice and macroblock header codewords to determine the numbers of blocks in respective macroblocks and the number of macroblocks in respective slices. Responsive to these numbers the controller 275 counts particular decoding operations and determines when certain decoding functions have been completed, and restarts a decoding cycle. Note that as indicated previously more than one record header may be included in a transport block, but only the first record header is identified by the transport block header. as such only the first record header in a transport block may be excised by the element 256. In order to identify and extract the information from such record headers, and excise such record headers from the data stream, the controller 275 counts the number of macroblocks processed by the VLD 272, and on completion of the last macroblock in a slice recognizes the next occurring data in a transport block as a record header. It thereafter reads the information in the record header, to establish subsequent cyclic operations, and precludes its passage to the buffer 273.

The controllers 271, 275 and 277 are indicated in the figure as three separate elements, however it should be appreciated that they may be subsumed in a single controller element.

The circuitry of FIG. 9 does not provide variable length decoded data but rather only parses respective variable length codewords, and provides them in a form similar to the data provided at the output of the compressor 10. As such circuitry substantially complementary to compressor 10 may be utilized for the decompressor 27. It should be recognized however that the circuitry of FIG. 9 may be arranged to provide decoded variable length codes obviating a VLD in the decompressor circuitry.

In the FIG. 9 provision is made for a variety of error concealment methodologies. For example, even though a transport block includes an error, the data for that block may be processed and passed on to the decompressor. In this instance an error flag is generated for each data word of the transport block and carried along with the codewords applied to the decompressor. The error flags are provided by the deselect controllers 271 and 277 and coupled to the buffer stores 273 and 279, wherein they are stored in memory locations corresponding with the associated erroneous transport block codewords.

In an alternative system wherein corrupted transport blocks are not processed, assume that a LP transport block is lost. The LP channel provides coefficient data of lesser importance to the reconstruction of images, and in fact DCT blocks may be decompressed without these coefficients, albeit the respective decompressed blocks will exhibit less spatial resolution. Therefore, when LP erroneous transport blocks are excised from the data stream, and data is being reconstructed at the multiplexer 274, after each block codeword CW#j of HP data, an EOB code is inserted in lieu of LP data. The EOB code is provided by the controller 275 and multiplexed into the data stream via the multiplexer 274. To indicate that the EOB for the respective blocks is a forced or artificial EOB, an error flag may be carried along with the EOB signal. The forced EOB signal is designated EOBE.

The controller 275 is provided the transport header information for both channels and indexes the block information available in the storage buffers 273 and 279. The macroblock and block data occur in a known sequence, enabling the controller to recognize lost data, and to provide and append EOBE codes to the HP data for lost LP data.

In general very few errors are expected to occur in the HP channel due to the robustness by which it is transmitted. However, if an error does occur in the HP channel, the data in the LP channel corresponding to blocks of data lost in the HP channel becomes meaningless. The controller 275 is programmed to recognize lost HP data via an interruption of the normal sequence of information identified by the nonerroneous transport block headers. When lost HP data is detected, the corresponding LP data is flushed from the storage buffer 279, that is, it is not passed on to the decompressor. In addition, the controller 275 may be arranged to provide error data to the decompressor, in a form which identifies lost information, i.e., macroblock or slice or frame data which are not being provided from the priority deselect processor.

The controller 275 is responsive to the overall system controller via the control bus CB, to initialize or reinitialize the controllers 271, 277 and VLD's 272, 278 on start up and channel changes, etc. In addition the controller 275 communicates with the transport processor 25 and rate buffers 23 and 24 for controlling the rate of information provided to the priority deselect circuitry.

Figure 10:
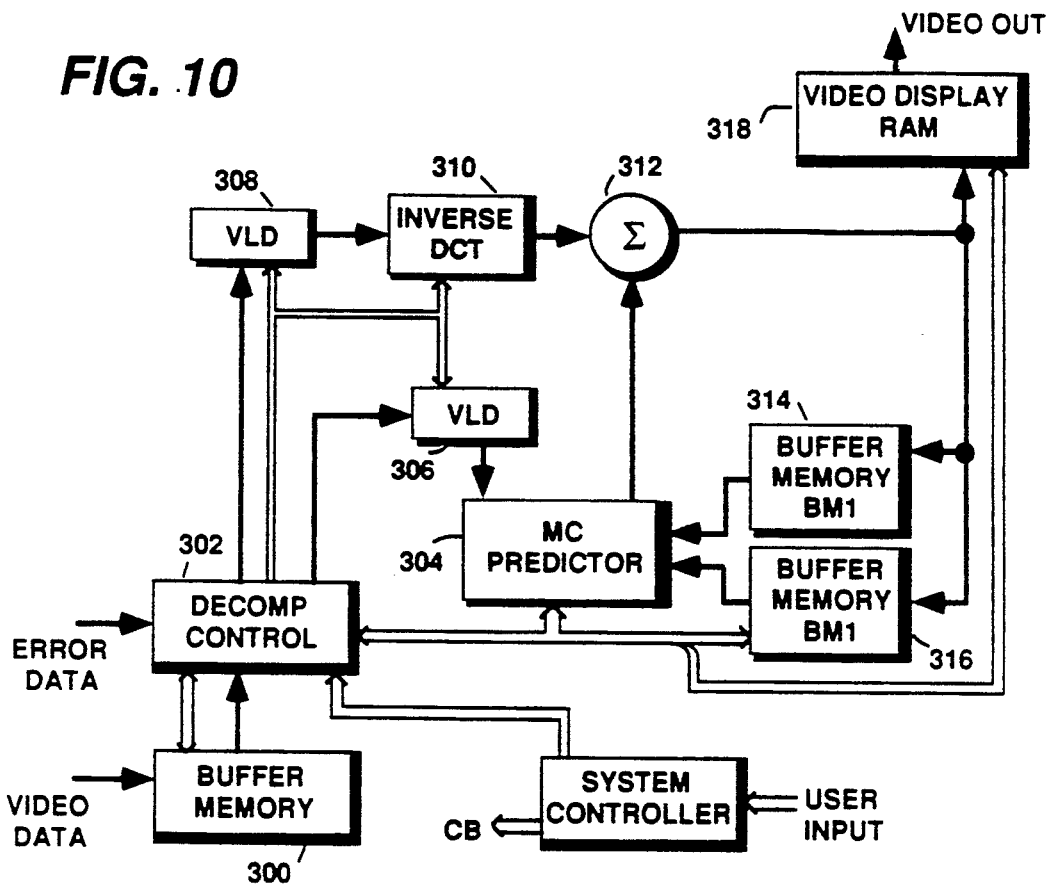
FIG. 10 is a block diagram of exemplary circuitry which may be implemented for the decompression circuit 27 of FIG. 1.

FIG. 10 illustrates an exemplary arrangement of the decompression apparatus 27.

Error concealment will not be discussed with respect to this apparatus as it is not the subject of this invention. Suffice it to say that error data from the priority deselect processor is applied to the decompression controller 302 to preclude updating areas of the video display RAM 318 corresponding to missing blocks of data, and that the apparatus responds to forced EOB codes as if they are normally occurring EOB codes.

Generally the circuitry of FIG. 10 is arranged to decompress video data provided in MPEG-like hierarchical format. The video data provided by the multiplexer 274 of the priority deselect processor is applied to a buffer memory 300. This data is accessed by the decompression controller 302 wherein header data is extracted to program the controller 302. The variable length codewords corresponding to DCT coefficients are extracted and applied to a variable length decoder (VLD) 308 and the variable length codewords corresponding to motion vectors are applied to the variable length decoder (VLD) 306. The VLD 308 contains apparatus for performing variable length decoding, inverse run length decoding and inverse DPCM coding as appropriate under the control of the controller 302. Decoded data from the VLD 308 are applied to an inverse DCT circuit 310 which includes circuitry to inverse quantize the respective DCT coefficients and to convert the coefficients to a matrix of pixel data. The pixel data is then coupled to one input of an adder 312, the output of which is coupled to the video display ram 318 and buffer memories 314 and 316.

The VLD 306 includes circuitry to decode the variable length encoded motion vectors and to perform inverse DPCM coding of the motion vectors as appropriate under the control of the controller 302. Decoded motion vectors are applied to a motion compensated predictor 304. Responsive to the motion vectors the predictor accesses corresponding blocks of pixels stored in one (forward) or both (forward and backward) of the buffer memories 314 and 316. The predictor provides a block of data (from the one of the buffer memories) or an interpolated block of data (derived from respective blocks from both buffer memories) to a second input of the adder 312.

Decompression is performed as follows. If a field/frame of input video data is intraframe encoded there are no motion vectors and the decoded DCT coefficients correspond to blocks of pixel values. Thus for intraframe encoded data the predictor 304 applies a zero value to the adder 312 and the decoded DCT coefficients are passed unaltered by the adder 312, to the video display RAM where they are stored for readout according to normal raster scanning. The decoded pixel values are also stored in one of the buffer memories 314 and 316 for use in forming predicted image values for decoding motion compensated frames (B or P).

If a field/frame of input data corresponds to a forward motion compensated P field/frame, the decoded coefficients correspond to residues or differences between the present field/frame and the lastmost occurring I frame. The predictor 304 responsive to the decoded motion vectors accesses the corresponding block of I frame data stored in either buffer memory 314 or 316 and provides this block of data to the adder wherein respective blocks of residues provided by the inverse DCT circuit 310 are added to the corresponding block of pixel data provided by the predictor 304. The sums generated by the adder 312 correspond to the pixel values for the respective blocks of the P field/frame, which pixel values are applied to the display RAM 318 to update respective storage locations. In addition the pixel values provided by the adder 312 are stored in the one of buffer memories 314 and 316 not storing the I field/frame of pixel data utilized to generate the predicted pixel data.

For bidirectionally encoded (B) field/frames the operation is similar, except predicted values are accessed from the stored I and P pixel data stored in both buffer memories 314 and 316 depending upon whether the respective motion vectors are forward or backward vectors or both. The generated B field/frame pixel values are applied to update the display RAM 318, but are not stored in either of the buffer memories, as B field/frame data is not utilized for generating other field/frames of picture data.

Figure 11:
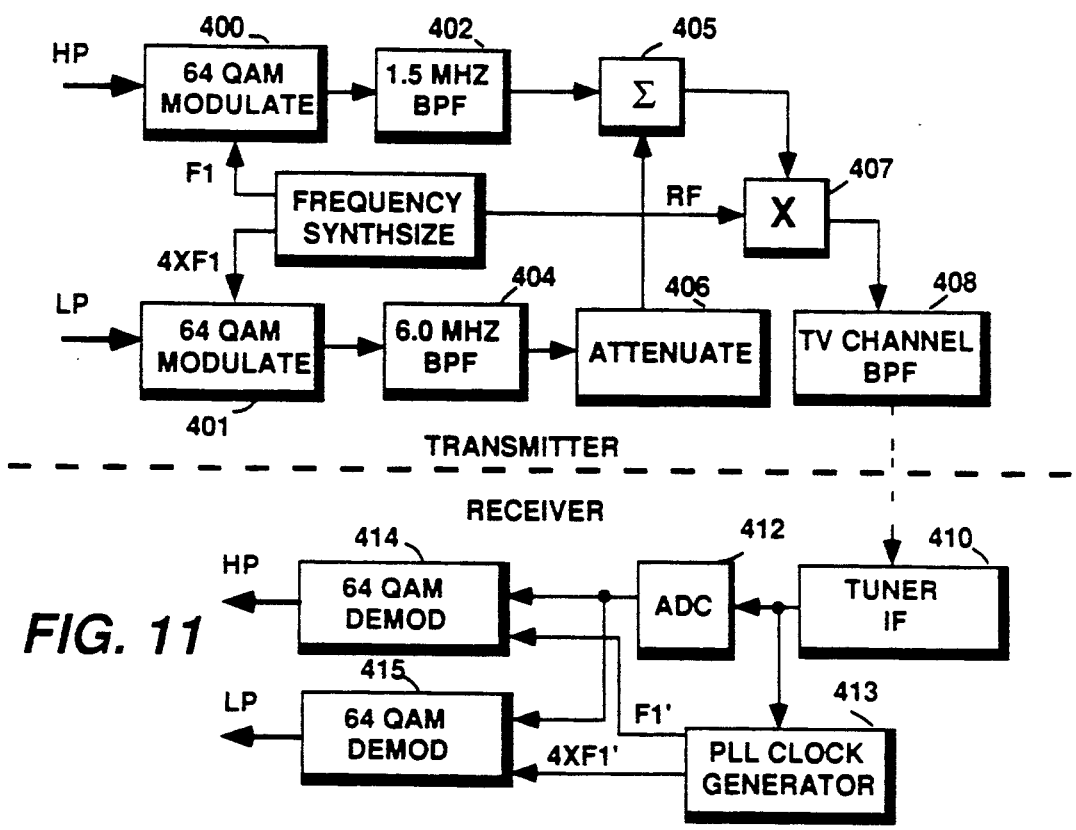
FIG. 11 is a block diagram of exemplary circuitry which may be implemented for the MODEMS 17 and 20 of FIG. 1.

FIG. 11 illustrates exemplary modem circuitry for both the transmitting and receiving ends of the system. HP and LP data from the forward error correction circuits 15 and 16 are applied to respective 64 QAM modulators 400 and 401. The modulator 400 provides an HP analog signal with a −6 dB bandwidth of approximately 0.96 MHZ. This signal is applied to a 1.5 MHZ band pass filter 402 to eliminate high frequency harmonics, and then is applied to an analog signal summer 405. The modulator 401 provides an LP analog signal with a −6 dB bandwidth of approximately 3.84 MHZ. This signal is applied to a 6 MHZ band pass filter 404 to eliminate high frequency harmonics, and then is applied to an attenuator 406. The attenuator 406 reduces the amplitude of the LP analog signal by approximately 9 dB relative to the HP analog signal. The attenuated LP signal is then coupled to the analog signal summer 405, wherein it is summed with the analog HP signal to produce a signal with a frequency spectrum similar to the signal spectrum shown in FIG. 1. The combined signal is applied to a mixer 407 wherein it is multiplied by an RF carrier to frequency translate the combined signal to a frequency band that comports with a standard TV transmission channel. The translated signal is then applied to a band pass filter 408, which tailors the spectral characteristics of the frequency translated signal to fit within the standard channel.

At the receiver, the transmitted signal is detected by a tuner/IF circuit 410 of conventional design, and applied to a PLL circuit 413 and an analog-to-digital converter (ADC) 412. The digitized signal is coupled to respective 64 QAM demodulators 414 and 415. The demodulators 414 and 415 include band pass filters at their respective input connections to band limit the spectrum of the signals to be processed thereby to conform to the nominal signal spectrum of the HP and LP signals. The demodulators 414 and 415 are of conventional QAM demodulator design and are responsive to clock signals provided by the PLL circuit 413. The PLL 413 develops the requisite clock signals via phase locking a signal developed by a voltage controlled oscillator to one of the two carriers attendant the QAM signals.

The invention has been described in terms of an MPEG like signal however it should be appreciated that it is amenable to processing signals compressed in other formats and by other transforms. The only requirement on the type of compression is that it provide data that can be prioritized in hierarchical levels, as for example sub band or pyramid transforms.

What is claimed is:

1. Apparatus for encoding a television signal comprising:
    a source of video signals;
    first means, coupled to said source, for providing a compressed version of said video signals, said compressed version including a first sequence of codewords of varying types defining said compressed video signal and a second sequence of codewords associated with said first sequence and indicating said types;
    second means, coupled to said first means, and responsive to said second sequence of codewords for variably parsing said first sequence of codewords into a high priority codeword sequence and a low priority codeword sequence according to the type of respective codewords of said first sequence;

a source of audio signal occurring as a sequence of codewords;

third means, coupled to said second means and said source of audio signal, for forming mutually exclusive transport blocks of said high priority codeword sequence, said low priority codeword sequence and said sequence of audio codewords, each transport block including a predetermined bit capacity occupied by codewords of one of high priority, low priority or audio data, transport block header information for identifying said data, and error check bits generated over said data and said transport block header information, said third means providing a first transport block sequence including transport blocks of said high priority codewords, a second transport block sequence including transport blocks of said low priority codewords, and wherein transport blocks of said audio codewords are interleaved with transport blocks of at least one of said first and second transport block sequences; and means including means for modulating said first and second transport block sequences on separate carriers, and combining said separately modulated carriers.

2. The apparatus set forth in claim 1 wherein said means including means for separately modulating said first and second transport block sequences further includes:

first and second rate buffers respectively coupled to receive said first and second transport block sequences, for accepting transport block codewords at varying intervals and outputting transport block codewords at a substantially constant rate.

3. The apparatus set forth in claim 2 wherein said means including means for separately modulating said first and second transport block sequences further includes:

first and second forward error correcting encoders, respectively coupled to said first and second rate buffers, for generating respective error correction codes associated with intervals of data provided by said rate buffers and appending said error correction codes to said intervals of data provided by said rate buffers.

4. The apparatus set forth in claim 2 wherein said first means includes means, responsive to a control signal for adaptively controlling the volume of said compressed version of said video signals; and wherein said rate buffers include means for providing a signal indicating the relative fullness of said rate buffers; and means responsive to said signal indicating the relative fullness of said rate buffers for generating said control signal.

5. The apparatus set forth in claim 1 wherein said first means includes means for adaptively controlling the volume of said compressed version of said video signals.

6. The apparatus set forth in claim 1 wherein said first means includes;

means for selectively providing frames of intra-frame compressed video data interspersed with frames of motion-compensated-predictive compressed data; and means for variable-length encoding at least portions of said intra-frame compressed video data and said motion-compensated-predictive compressed data; and wherein said second means parses intra-frame compressed video data in different proportions than said motion-compensated-predictive compressed data.

7. The apparatus set forth in claim 6 wherein said means for selectively providing frames of intra-frame compressed video data interpersed with frames of motion-compensated-predictive compressed data includes;

discrete cosine transform means, coupled to said source of video signals for providing transform coefficients representing blocks of pixels; and quantizing means for adaptively limiting the dynamic range of said transform coefficients.

8. The apparatus set forth in claim 7 wherein said means for selectively providing frames of intra-frame compressed video data interspersed with frames of motion-compensated-predictive compressed data further includes means for variable length encoding said transform coefficients.

9. In a receiver for receiving a television signal of the type including compressed video data variably parsed on an image area by image area basis into high and low priority channels, the data in said high and low priority channels occurring in transport blocks of predetermined data capacity, said transport blocks including transport header information having control data related to said variable parsing, signal data, and error check data related to the transport header information and signal data contained in respective blocks, the signal data in each transport block corresponding to an exclusive type of data (e.g., to high priorty video data, or low priority video data); apparatus comprising:

first means for receiving said television signal and providing first and second data streams corresponding to transport blocks from said high and low priority channels respectively;

second means, coupled to said first means, for providing first and second sequences of codewords corresponding to high priority video dat and low priority video data respectively with said transport block header information excised therefrom, and providing a further sequence of codewords corresponding to said transport block header information;

third means, coupled to said second means, and responsive to said transport block header information, including said control data, for combining said first and second sequences of codewords into a further sequence of codewords; and fourth means, coupled to said third means, for decompressing said further sequence of codewords representing compressed video data to produce a noncompressed video signal.

10. The apparatus set forth in claim 9 wherein said first means further includes first and second rate buffers for providing said first and second data streams at variable rates.

11. The apparatus set forth in claim 9 wherein said compressed video data corresponds, in part, to codewords related to DCT coefficients, said 'DCT coefficients occurring in blocks of sequences, the coefficients of each sequence occurring in descending order of importance with respect to reconstructing images, and wherein codewords of greater importance for each block are included in said high priority channel and codewords of lesser importance for each block are included in said low priority channel, and said third means includes means to recombine the codewords of greater and lessor importance of each block in descending order of importance.

12. The apparatus set forth in claim 9 wherein said television video signal includes forward error correction codes and said first means includes means, responsive to said forward error correction codes, for performing error correction on said television signal.

13. The apparatus set forth in claim 9 wherein said further sequence of codewords represent compressed video data in the form of variable length encoded intraframe compressed data interleaved with variable length encoded motion-compensated-predictive-frame compressed data, and said fourth means includes;
   variable length decoding means, responsive to said further sequence, for variable length decoding said further sequence; and
   decompression means, coupled to said variable length decoding means, for selectively decoding intraframe compressed data and motion-compensated-predictive-frame compressed data.

14. Apparatus for encoding a television signal comprising:
   a source of video signals;
   first means, coupled to said source, for providing a compressed version of said video signals, said compressed version including a first sequence of codewords of varying types defining said compressed video signal and a second sequence of codewords associated with said first sequence and indicating said types;
   second means, coupled to said first means, and responsive to said second sequence of codewords for variably parsing, on an image area by image area basis, said first sequence of codewords into a high priority codeword sequence and a low priority codeword sequence according to the type of respective codewords of said first sequence;
   third means, coupled to said second means, for forming mutually exclusive transport blocks of said high priority codeword sequence, and said low priority codeword sequence, each transport block including a predetermined bit capacity occupied by codewords of one of high priority and low priority data, transport block header information for identifying said data, and including control information related to said variable parsing, and error check bits generated over said data and said transport block header information, said third means providing a first transport block sequence including transport blocks of said high priority codewords, and a second transport block sequence including transport blocks of said low priority codewords;
   forward error check means, for developing error correction data corresponding to mutually exclusive portions of said first transport block sequence and said second transport block sequence and appending the corresponding error correction data to the respective first transport block sequence and second transport block sequence
   means including means for separately modulating said first and second transport block sequences with appended error correction data.

15. Apparatus for encoding a television signal representing images, comprising:
   a source of a sequence of codewords representing compressed video signal;
   first means, coupled to said source and responsive to said codewords for parsing, as a function of the amount of video signal data representing respective predetermined image areas, said sequence of codewords into a high priority codeword sequence and a low priority codeword sequence according to the relative importance of respective codewords for image. reproduction, and providing indicia for reconstructing said high and low priority sequences into a single sequence;
   second means, coupled to said first means, for forming mutually exclusive transport blocks of said high priority codeword sequence, and said low priority codeword sequence, each transport block including a predetermined bit capacity occupied by codewords of one high priority and low priority data, transport block header information, including said indicia, for identifying said data, and error check bits generated over said data and said transport block header information, said second means providing a first transport block sequence including transport blocks of said high priority codewords, and a second transport block sequence including transport blocks of said low priority codewords;
   forward error check means, for developing error correction data corresponding to mutually exclusive portions of said first transport block sequence and said second transport block sequence and appending the corresponding error correction data to the respective first transport block sequence and second transport block sequence.

16. The apparatus set forth in claim 15 wherein said second means includes means for providing transport block header information which points to specific data within respective transport blocks.

17. The apparatus set forth in claim 16 wherein said specific data is further transport block header information.

18. The apparatus set forth in claim 15 wherein respective frames of said compressed video signal are compressed according to intraframe or interframe coding methods, and said first means parses said sequence of codewords as a function of the amount of video signal data representing respective predetermined image areas, and as a function of whether the current frame is intraframe or interframe encoded.

* * * * *